Jan. 30, 1962     HANS BEAT FEHLMANN     3,018,850
ELEVATING PLANT
Filed June 16, 1958     4 Sheets-Sheet 1
FIG.1
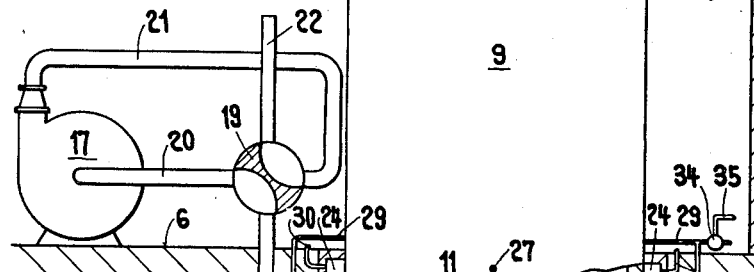
FIG.2
FIG.3
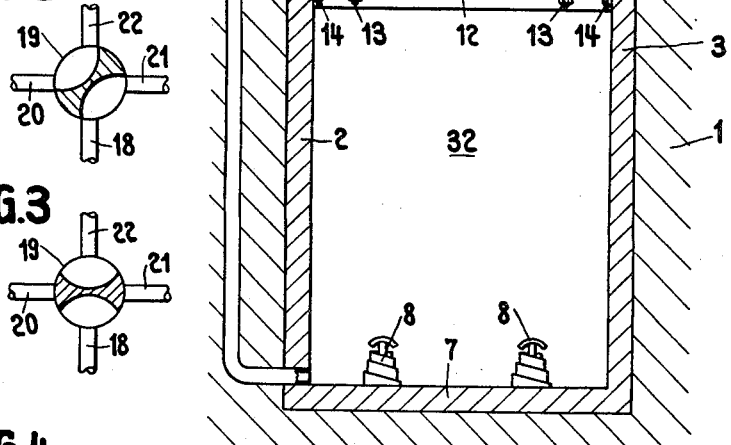
FIG.4
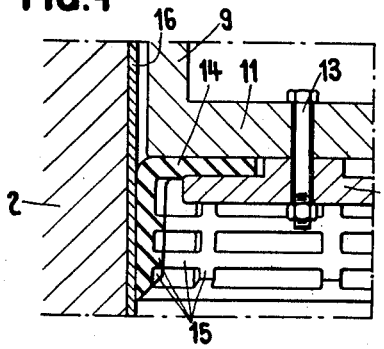
FIG.5
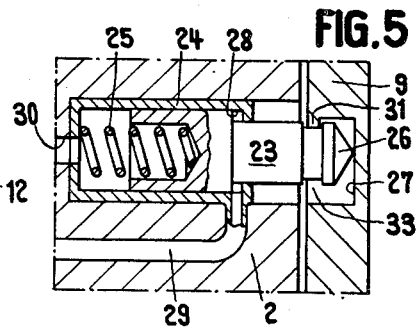
INVENTOR.
Hans Beat Fehlmann
BY
*Imirie & Smiley*
ATTYS.

Jan. 30, 1962 HANS BEAT FEHLMANN 3,018,850
ELEVATING PLANT
Filed June 16, 1958 4 Sheets-Sheet 2
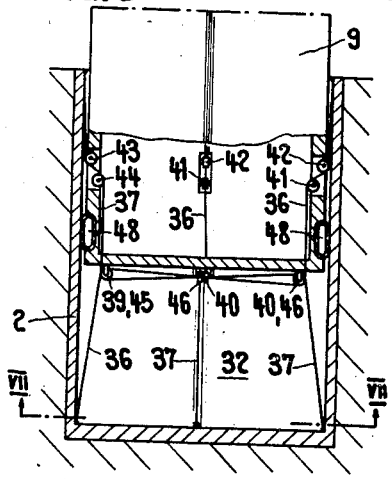
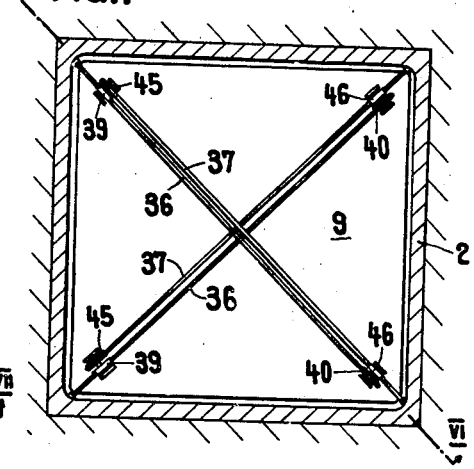
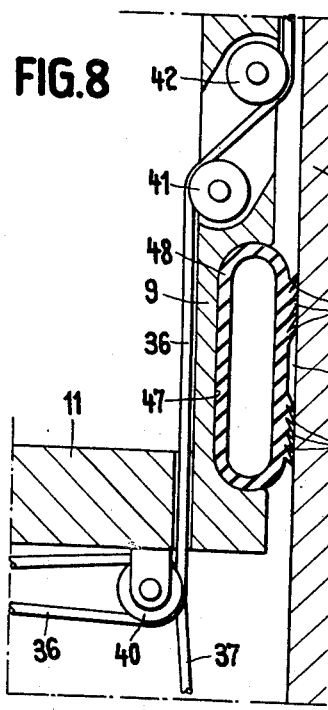
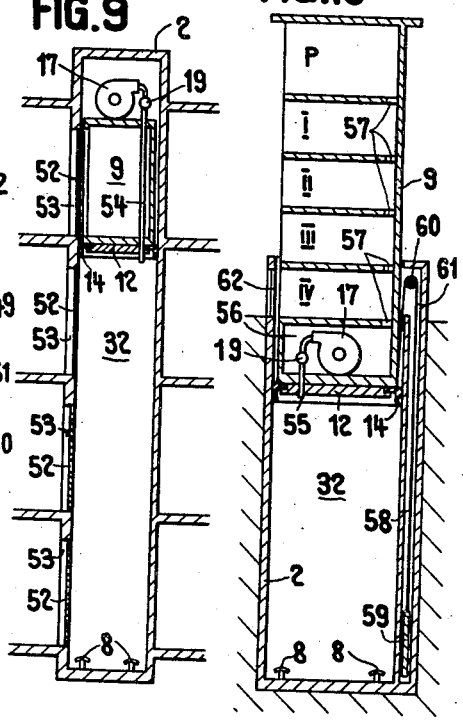
INVENTOR.
Hans Beat Fehlmann

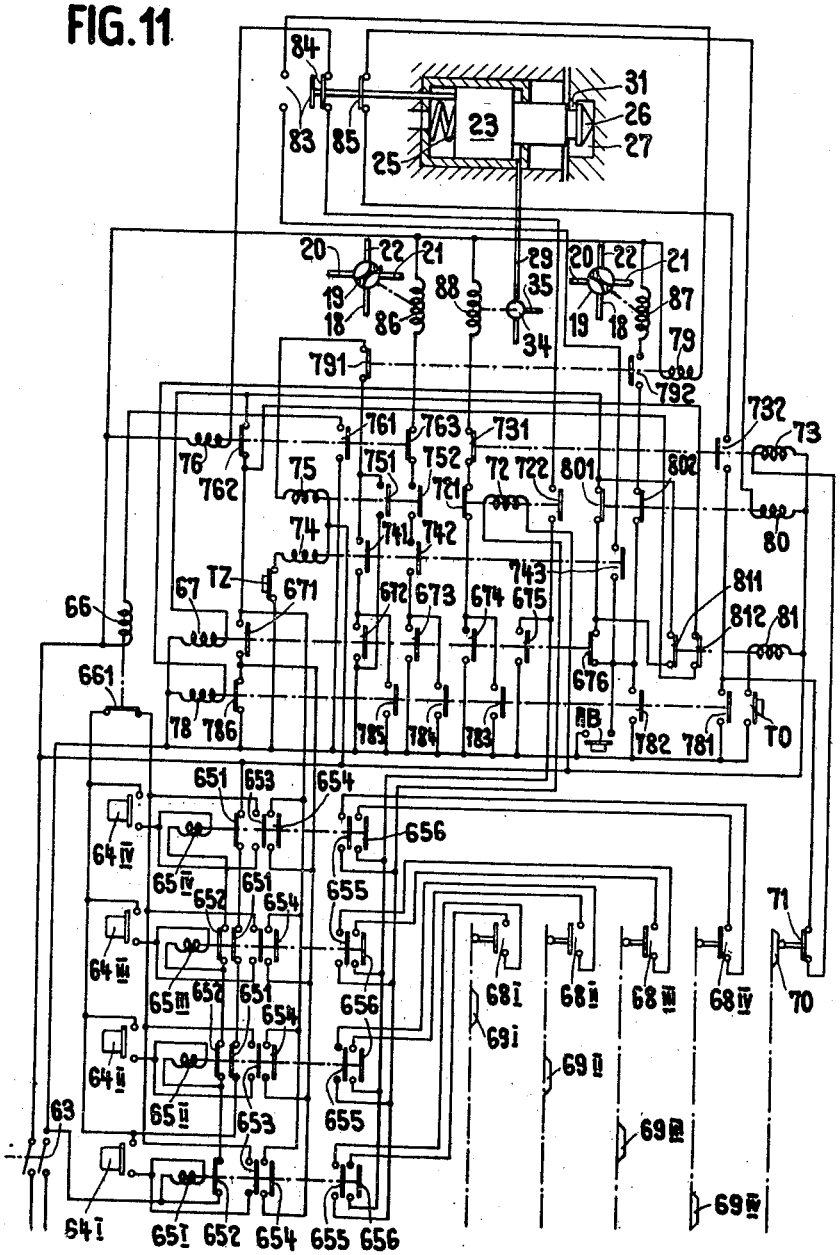

Jan. 30, 1962　　　HANS BEAT FEHLMANN　　　3,018,850
ELEVATING PLANT
Filed June 16, 1958　　　　　　　　　　　　　　4 Sheets-Sheet 4

INVENTOR.
HANS BEAT FEHLMANN
BY
ATTORNEY

United States Patent Office 3,018,850
Patented Jan. 30, 1962

3,018,850
ELEVATING PLANT
Hans Beat Fehlmann, Thunstrasse 130,
Muri, near Bern, Switzerland
Filed June 16, 1958, Ser. No. 742,198
Claims priority, application Switzerland June 28, 1957
9 Claims. (Cl. 187—17)

This invention concerns plants with a pit and a body raisable and lowerable therein, such as, for instance, elevator plants, lowerable buildings such as, for instance, garages, raisable and lowerable working platforms etc.

In most of the prior elevating plants the raisable and lowerable body is suspended on wire ropes and the lifting appliance is mounted above the uppermost position of the body. There are also prior plants in which the raisable and lowerable body moves only over a short path and is mounted on a hydraulically operated column.

The plant according to the invention is characterised in that the raisable and lowerable body seals the space of the pit lying beneath the body as a piston the space of a cylinder, a pressure medium for raising and lowering the body in the pit being feedable to and leadable off said space.

For sealing said cylinder space a diaphragm or the like engaging the pit wall may be mounted on the raisable and lowerable body.

Other objects and features will be apparent as the following description proceeds, reference being had to the accompanying drawings showing, by way of examples, some embodiments of the invention, and wherein:

FIG. 1 is a sectional elevation of a plant with a raisable and lowerable working platform;

FIGS. 2 and 3 show several operating positions of the multiple-way valve illustrated in FIG. 1;

FIG. 4 shows a detail of FIG. 1 on a larger scale;

FIG. 5 illustrates on a larger scale a detail of FIG. 1 which may also be used in other embodiments of the invention;

FIG. 6 is a sectional elevation of a further example, taken along the line VI—VI of FIG. 7;

Figure 12:
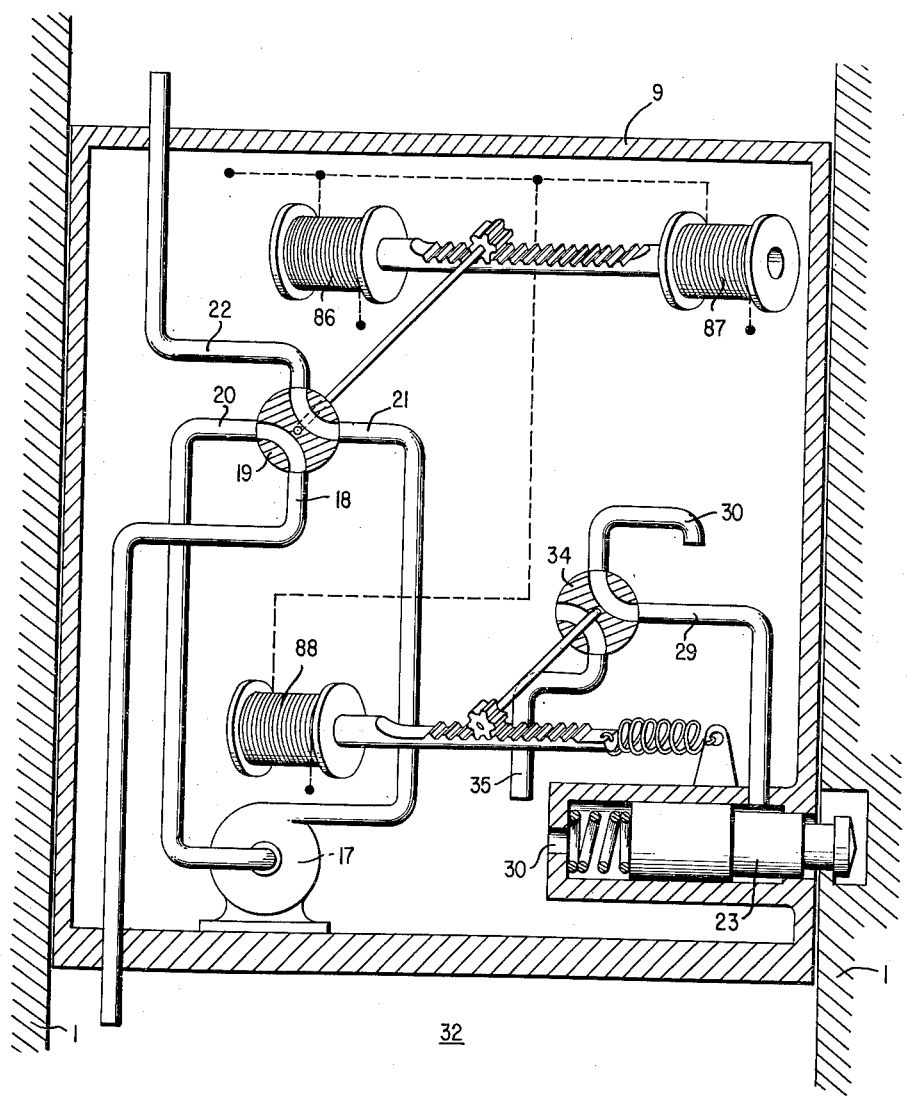

FIG. 7 which is a sectional view taken on a larger scale along the line VII—VII of FIG. 6;

FIG. 8 illustrates on a larger scale a detail of FIGS. 6 and 7;

FIG. 9 is a sectional elevation of a passenger elevating plant extending through four floors;

FIG. 10 is a sectional elevation of a plant with a raisable and lowerable building having several floors, such as a storehouse or a garage;

FIG. 11 is an electric wiring diagram for the plant of FIG. 10; and

FIG. 12 is an enlarged sectional elevation of control means for raising and lowering the body applicable to all of the embodiments and showing the relation of said means to the locking device.

Referring to FIG. 1, a pit or shaft 2 of round or rectangular cross section is sunk into the soil 1 and, for instance, made from concrete. Above the wall 3 of the pit 2 there is a platform 4 or the like whose level 5 lies above the soil level 6. Damping buffers 8 are provided on the base 7 of the pit 2 in which a hollow body 9 is raisable and lowerable. The cover 10 of the body 9 forms a working platform which for carrying out certain work is to be moved from level 6 to level 5 and vice versa. A diaphragm 14 made, for instance of leather, rubber, sheet metal (e.g. copper) or plastic material, is fixed to the outside of the base 11 of the body 9 by means of a disc 12 and screws 13. The diaphragm 14 is so shaped that it also tightly engages the rounded pit corners even in the case of a rectangular cross section of the pit 2 (see for instance FIG. 7). For improving the elastic pressure of the diaphragm 14 against the pit wall, the inner side of the diaphragm 14 is equipped with ribs 15 crossing one another (FIG. 4). However, also a spring (not shown) may act onto the diaphragm 14 to augment its elastic pressure against the pit wall. In order to obtain a smooth inner surface of the pit 2, it may be lined by plastics or by a steel shell 16 (FIG. 4) or the like. On the level 6 a fan 17, pump, or the like, is installed which may be reversible, if desired. A conduit 18 is connected to a multiple-way valve 19 and enters the inside of the pit 2 above the base 7 but below the upper edge of the buffers 8 when they are compressed by the body 9. The suction and the pressure sides of the fan 17 are connected to the valve 19 by means of conduits 20 and 21 respectively, while a conduit 22 connects the valve 19 with the atmosphere. A blocking, or locking member 23 (FIG. 5) mounted in a cylinder 24 of the pit wall to reciprocate is under constraint of a helical spring 25 tending to press the blocking member 23 towards the inside of the pit 2 where the blocking cone 26 of the member 23, at a prescribed level of the body 9, engages in a notch-like rest 27 of the body 9 to secure the latter at the prescribed altitude level. A conduit 29 for a pressure medium such as, for instance, oil, water or air is connected to the annular space 28 of the cylinder 24, said medium urging the blocking member 23 away from the body 9 against the constraint of the spring 25 to remove the cone 26 from the rest 27 when the body 9 is to be unlocked. A conduit 30 connects the cylinder side away from the body 9 with the atmosphere. In the blocking position as shown in FIG. 5 the body 9 is supported on the member 23 behind the cone 26 by means of a shoulder 31 of the body 9. Therefore, pressure medium entering the annular space 28 through the conduit 29 can urge the member 23 backwards only when the body 9 has been lifted by the pressure medium in the cylinder space 32 to an extent allowing the cone 26 to traverse the opening 33. Therefore, securing of the body 9 by means of the blocking member 23 is guaranteed until a pressure occurs in the space 32 which hinders the body 9 from dropping down in the pit 2. For that reason the control of the blocking member 23 is adequately synchronized with the control of the conduit 18 either by hand or automatically. Preferably, several blocking, or locking members 23 are distributed around the circumference of the pit 2, these members cooperating in the above-described manner with corresponding rests 27 of the body 9. The cylinder or cylinders 24 might also be provided on the body 9 and the rest or rests 27 on the pit 2, see FIG. 12. For lowering the body 9 a conduit (not shown) for discharging pressure medium from the space 32 might traverse the body 9 and be closed and opened by means of a valve (not shown) attainable from the working platform 10.

The above described plant works as follows:
In the position shown in FIG. 1 the working platform 10 is flush with the upper level 5. The blocking cones 26 of the members 23 engage under the constraint of the springs 25 into the rests 27 of the body 9 and secure the latter in this position. The cylinder space 32 comprises compressed air. If the working platform 10 is now to be lowered to the level 6, pressure is at first given into the annular space 28 by opening the conduit 29 with the aid of a hand-operated multiple-way valve 34. The blocking cone 26 can not yet leave the rest 27 since it strikes against the shoulder 31 of the body 9. The valve 19 hitherto closed (FIG. 3) is brought into the position shown in FIG. 2 until the compressed air pressed by the fan 17 through the conduits 21 and 18 into the space 32 has lifted the body 9 to such a small extent that the cone 26 can leave the rest 27 under the action of the pressure oil in the annular space 28. Immediately afterwards the valve 18 is brought into the position of FIG. 1, so that the fan 17 can suck air off the space 32 and the body 9 can move downwards at a prescribed speed until the working platform 10 is flush with the level 6 and the disc 12 is supported on the buffers 8. During lowering of the body 9 the fan 17 may, if desired, be shut down. When the working platform 10 is again to be raised from level 6 to level 5, the valve 34 is brought to such a position, that the pressure in the annular space 28 is exhausted through the conduits 29 and 35 and the spring 25 can press the cone 26 against the outer surface of the body 9. Afterwards, the valve 19 is brought into the position of FIG. 2 so that the fan 17 delivers compressed air into the space 32 and the body 13 is lifted until the cone or cones 26 jerk into the rest or rests 27 under the action of the spring or springs 25 so that the position of FIG. 1 is again reached with the exception of the position of valve 19. Means (not shown) may be provided for automatically shutting down the fan 17 after the cones 26 having entered the rests 27. Instead of arranging the fan 17 stationarily as shown in FIG. 1, it may be installed on the body 9, for instance, in the hollow space of the same, see FIG. 12. The control of the fan 17 and of the blocking member or members 23 may also be caried out automatically, e.g., by means of a push button or buttons.

Experience hitherto made with plants according to the invention has proved that, under certain circumstances, special arrangement for guiding the body 9 in the pit 2 may become necessary in every possible embodiment of the invention, also in the examples of FIGS. 1, 9 and 10. A certain kind of such guiding arrangement will now be explained with reference to FIGS. 6 to 8.

In FIGS. 6 and 7 two flexible guide members in the shape of ropes 36, 37 extend between every two diagonally opposed corners of the rectangular cross section of the pit 2. In the one of the corners the rope 36 is fixed to the lower end of the corner of the pit 2 and the other rope 37 to the upper end of the same corner. The rope 36 runs over rollers 39, 40, 41 and 42, all mounted on the body 9, to the upper end of the diagonally opposed pit corner where it is fixed. The rope 37 is fixed to the upper end of the first of said two opposed corners and runs over rollers 43, 44, 45 and 46, all mounted on the body 9, to the lower end of the second of said opposed pit corners, where it is fixed. Therefore, the body 9 is guided by four ropes forming two rope pairs 36, 37 each of which lies between two diagonally opposed pit corners. Experience has proved that such a guide prevents every canting or jamming of the body 9 in the pit 2 even in the uppermost position of the body (FIGS. 1, 10) and at a high wind pressure onto the body 9.

In FIGS. 6 and 8 the diaphragm 14 of FIG. 1 is replaced by an annular packing 48 engaged in an annular groove 47 of the body 9. This packing is in the shape of a hose from yieldable material such as leather, rubber or plastics, for instance, which is either filled with a gas (e.g. air) or with a liquid (e.g. oil, water) and bears against the wall of the pit 2. For improving the tightening power in both moving directions of the body 9, the hose 48 has prominences 49, 50, the prominences 49 being directed towards the top and the prominences 50 towards the bottom. The hose 48 forms an especially suitable packing when the plant is operated by underpressure in the cylinder space 32. In order to improve the tightening power of the hose 48 its recess 51 can possibly be filled with oil or another liquid.

In the example illustrated in FIG. 9 the body 9 forms the cabin of a passenger elevator. As in the preceding embodiment the body 9 has a diaphragm 14 of similar kind as in FIGS. 1 and 4, fixed by means of a disc 12 and screws to the base 11. The diaphragm 14 bears against the inner wall of the pit 2 extending through four floors and having any suitable cross section, for instance of rectangular shape with rounded corners as shown in FIG. 7. The diaphragm 14 forms together with the pit 2 and the disc 12 a sealed cylinder space 32 as in the former example. Also here, buffers 8 are installed on the base 7 of the pit 2. The doors 52 of the pit close the door apertures 52 of the pit 2 air tightly in a well-known manner. The fan 17 delivering the pressure medium is mounted on the top of the cabin 9. A conduit 54 connects the fan 17 with the cylinder space 32 and comprises the same multiple-way valve 19 as in FIGS. 1 to 3, which is connected with the fan 17 and with the atmosphere by the same conduits as in FIG. 1. Here too, blocking means, for instance of the kind shown in FIG. 5, are provided in reach of the various floors. These blocking means are not controlled by hand as in FIG. 5, but by means of a push button or buttons (not shown) inside the cabin 9 to operate a valve in a manner not illustrated, the push buttons serving at the same time for changing the position of the valve 19 and/or for switching in and shutting down the fan 17. For lowering the cabin special precautions are necessary in the control system in that the cabin 9 must at first be slightly lifted and then the blocking members 23 withdrawn. By the withdrawal of the blocking members switches can be reversed which bring the valve 19 to the position for lowering the cabin.

In the position shown in FIG. 9 the cabin 9 is at the level of the fourth floor. For lifting the cabin 9 from the third to the fourth floor by operating the corresponding push button, the fan 17 had been switched in and the valves 19 and 34 been controlled in such a way that compressed air entered the cylinder space 32 and pressure oil had withdrawn the blocking members 23 from the rests 27. After withdrawal of the cones 26 from the rests 27 the compressed air flowing into the cylinder space 32 lifted the cabin 9 to the fourth floor where it actually is in FIG. 1 and where it had been secured by the blocking members 23 after having automatically brought the conduits 29 (FIGS. 1 and 5) to discharge condition for the oil from the annular spaces 28 and the fan 17 having possibly been shut down. If it is now desired to go from the fourth floor downwards, the push button in the cabin corresponding to the floor to be reached is operated whereupon the blocking members 23 are withdrawn against the constrain of the springs 25 in a manner described in relation to FIGS. 1 and 5 and, with the fan 17 shut down, the valve 19 is connected to the exhaust conduit 22. The compressed air can now escape from the cylinder space 32 in such a way that the air cushion in the space 32 only allows the prescribed lowering speed of the cabin 9. Instead of mounting the fan 17 on the cabin 9, it could also be installed stationarily such as, for instance, in the manner shown in FIG. 1. Also in the embodiment of FIG. 9 guide means for the body 9 in the pit 2, such as for instance shown in FIGS. 6 to 8 may be used.

In the example shown in FIG. 10 the raisable and lowerable body 9 forms a building such as, for instance, a storehouse or a garage with several floors. Also in this embodiment, a diaphragm 14, for instance of the kind shown in FIGS. 1 and 4, bearing against the inner wall of the pit 2 is fixed to the base 11 of building 9 by means of a disc 12 and screws 13. The fan 17 is installed in the space beneath the lowermost floor. A conduit 55 traverses the base 11 and the disc 12 and enters the cylinder space 32 sealed by the pit 2, the diaphragm 14 and the disc 12. The same valve 19 with the same connections to the blast 17 and to the atmosphere are provided as in FIG. 1. When the garage 9 is to be lowered from the position of FIG. 10, the valve 19 is brought by means of a push button control or the like into the position of FIG. 1 so that the compressed air in the cylinder space 32 can escape through the conduit 55 and the fan 17, running either idly or being in operation for sucking the air off the space 32, to the space 56 wherefrom it can go out through openings 57 in the bottoms of the individual floors. If the building 9 is to be lifted in the pit 2, the fan 17 is switched in after having brought the valve 19 into the position of FIG. 2, so that the fan 17 can suck in air through the openings 57 and urge it under pressure through the conduit 55 into the cylinder space 32. Here too, blocking means as shown in FIG. 5 may be provided and operated by the push-button control for the valve 19. Instead of mounting the fan 17 on the building 9 it might be installed stationarily.

In a channel 58 of the pit 2, which may have a rectangular cross section such as, for instance, shown in FIG. 7, a counterweight 59 is arranged to be raised and lowered and is connected with the garage 9 by means of a rope 61 running on a roller 60. The counterweight 59 may be chosen with regard to the weight of the building 9 in such a way that for lifting the building 9 only a small overpressure is necessary. The counterweight 59 may even be so heavy that a permanent underpressure is necessary in the space 32, which must be reduced for lifting the body 9 and augmented for lowering the body 9. If the plant is operated by underpressure it is recommended to substitute a packing such as, for instance, the hose 48 of FIG. 8 for the diaphragm 14. Also in the embodiment of FIG. 10 guide means for the body 9 in the pit 2, such as for instance shown in FIGS. 6 to 8 may be used.

In the illustrated and described examples the body 9, due to the diaphragm 14 or the hose 48, seals the space 32 of the pit 2 beneath the body 9 as a piston seals a cylinder space. Instead of a diaphragm or a hose, an annular package for instance of leather, rubber, plastics or of the kind of piston rings may be engaged in an annular groove of the body 9 to seal the cylinder space 32. Also a fan may be used which is reversible and/or serves at the same time as a valve.

The overpressure required to be produced by the fan is not considerable. At a weight of the body 9 of 27 tons and a pit cross section of 18 m.$^2$ the necessary overpressure amounts for instance to 0.15 atmosphere gage pressure.

FIG. 11 shows, by way of example, a control circuit for the embodiment of this invention illustrated in FIG. 10. However, this control circuit is able to stop the building 9 in desired positions only on its upward motion. It is further assumed that the door 62 giving access to any of the garages lifted to the door level, may be opened by hand. The door closes in a well known manner a switch TO when it is in its open position and a switch TZ when it is in its closed position. The control circuit may be connected to a power source by means of the main switch 63.

When the building 9 in its lowest position the uppermost garage P is accessible without operation of the control circuit by opening the door 62. In order to lift any other of the garages I to IV to the level of door 62 the circuit has four push-buttons $64_I$ to $64_{IV}$. These push-buttons cooperate with relays $65_I$ to $65_{IV}$ mutually interlocked by means of rest contacts 651 and 652, and each relay 65 being able to hold itself through an own making contact 653 and a rest contact 661 of a relay 66. Each of relays 65 has a further making contact 654, these contacts 654 being connected in parallel into the exciting circuit of a relay 67. Further, each of the relays 65 has two making contacts 655 and 656 connected into the circuits of cam switches $68_I$ to $68_{IV}$, such contacts 68 being operated by cams $69_I$ to $69_{IV}$ fixed on the building 9, when the building reaches levels for which garages I, II, III and IV respectively are accessible through the door 62. The building has a further control cam 70 closing an end switch 71 whenever the building is in its completely lowered position. Switches 68 are connected in parallel into the exciting circuit of a relay 73. The above mentioned relay 67 has contacts 671 to 676, relay 72 has contacts 721 and 722 and relay 73 has contacts 731 and 732. The circuit further comprises relay 74 having contacts 741 to 743, relay 75 having contacts 751 and 752, relay 76 having contacts 761 to 763, relay 78 having contacts 781 to 786, relay 79 having contacts 791 and 792, relay 80 having contacts 801 and 802 and relay 81 having contacts 811 and 812, such relays and their contacts being interconnected as shown in FIG. 11. For initiating downward motion of the building 9 a push-button AB is provided.

Contacts 83 to 85 are operatively connected with the blocking member 23 by a rod of insulating material, contact 83 being opened and contacts 84 and 85 being closed when the blocking member is in its engaged position as shown in FIG. 11. If there are a number of blocking members, as will usually be the case, corresponding contacts 83, 84 and 85 respectively associated with different blocking members are connected in series into the same circuit, this circuit being only completed when all blocking members are either engaged or disengaged. Further it is assumed that the valve 19 is usually held in its neutral or closed position shown in FIG. 3 by spring action or gravity, but may be changed to its open positions shown in FIGS. 1 and 2 respectively under control of electromagnets 87 and 86 respectively. The control circuit has further an electromagnet 88 for opening the valve 34, thereby admitting pressure oil to the blocking members 23 when magnet 88 is excited. The mechanical connections for operation of valves 19 and 34 by the magnets 86, 87 and 88 are illustrated in FIG. 12.

The control circuit operates as follows:

In FIG. 11 the circuit is completely deenergized, the door 62 is closed, the blocking members 23 are engaged and the building is in its completely lowered position, garage P being directly accessible through door 62.

When another garage, for instance the lowermost garage IV is required to be lifted to the level of door 62 the main switch 63 has to be closed and the door 62 has to be shut. The door contact TZ is thereby closed and energizes the relay 74. By depressing push button $64_{IV}$ the associated relay $65_{IV}$ is energized and holds itself through its own contact 653 and contact 661, and through the still closed contacts 786, 654, 762 and 812 relay 67 is excited and by means of its contact 672 energizes relay 75, relay 75 starting up the fan 17 in a well known manner. At the same time electromagnet 86 is energized through the contacts 673, 742, 752 and 763 thereby changing valve 19 to the position shown in FIG. 2, so that air under pressure is admitted through pipe 18 to the space 32 below building 9. Simultaneously electromagnet 88 has been energized through contacts 674, 721 and 731, and the valve 34 has been opened thereby admitting pressure oil through pipe 29 to the cylinders of the blocking members 23, thereby tending to disengage the blocking members 23. However, the cones 26 of the blocking members are still locked behind the shoulders 31 thereby preventing disengagement of the blocking members. When the air pressure in the space 32 has sufficiently been increased the building 9 is slowly lifted whereby the blocking members are freed and are immediately disengaged from the notch-like rests under the still acting oil pressure. The building will now move upwards until the control cam $69_{IV}$ associated with the selected garage IV actuates the control switch $68_{IV}$, relay 72 being energized and the electromagnet 88 being thereby deenergized by opening of the rest contact 721 of relay 72. The oil pressure on the blocking members 23 is thereby removed so that such members are urged against the side walls of the building 9 by springs 25 and will soon engage the notch-like rests 27 of building 9 and secure the latter at a level at which garage IV is accessible. Contacts 84 and 85 are returned to the position shown in FIG. 11 thereby energizing relay 76 through contacts 722 and contact 84, the electromagnet 86 being thereby deenergized by opening of the relay contact 763. Relay 75 holds itself through its own contact 751 so that the fan 17 continues operation, but the deenergized electromagnet 86 drops the valve 19 into the closed position illustrated in FIG. 3 whereby the space 32 is shut off. Of course well known latch means may be provided allowing opening of the door 62 only when the blocking members 23 are engaged. When the door 62 is opened relay 81 is energized through the door contact 70 thereby deenergizing with its contact 812 the relay 67. Therefore, the circuit of relay 76 is also broken at contact 675, and by its contact 761 relay 76 deenergizes relay 66, thereby breaking with its contact 661 the self-holding circuit of the selecting relay $65_{IV}$ and therefore the circuit is reset for further operation.

When, after use of garage IV the building is required to be lowered again, the door 62 is closed whereby the relay 74 is excited again. The push-button AB is now depressed whereby the relay 78 is energized through contacts AB, 676 and 801. Through contacts 785, 741, and 791 relay 75 is energized and through contact 784 of the relay 78 and contacts 742, 752 and 763 the electromagnet 86 is excited so that further air is admitted to the space 32. Simultaneously the electromagnet 88 is excited through contacts 783, 721 and 731, whereby the valve 34 is opened and pressure oil is admitted to the blocking members 23. As soon as the building 9 is slightly lifted the blocking members are disengaged as explained, so that contacts 83 to 85 are again changed over. Contact 83 completes a circuit through contacts 782, 743 and 83 whereby relay 79 is energized and disconnects with its contact 791 the relay 75 so that the fan 17 is shut down. With its contact 752 relay 75 deenergizes electromagnet 86. However, electromagnet 87 is energized through contact 792 of relay 79 and therefore the valve 19 is immediately changed over into the position shown in FIG. 1 so that the air may flow out from the space 32 through pipe 18, valve 19, pipe 20, the fan 17, pipe 21, valve 19 and pipe 22, whereby the appreciable flow resistance of this circuit allows a relatively slow downward movement of the building 9. However, contact 791 of relay 79 may be omitted so that the fan continues its operation when the building 9 is lowered, in order to produce an underpressure in the space 32 as explained above.

At the beginning of the downward motion of building 9 contact $68_{IV}$ is opened and shortly before reaching the completely lowered position of the building 9 switch 71 is closed by its associated cam 70 so that the relay 73 is energized through contacts 781 and 71, the electromagnet 88 being thereby deenergized by contact 731 for ceasing oil admission to the blocking members 23. The blocking members are thus urged against the side walls of the building 9 and will soon engage the notch-like rest 27 securing the building in its completely lowered position. By the engagement of the blocking members contacts 83 to 85 are thrown to the position illustrated, and contact 85 thereby completes a circuit through contacts 781, 732 and 85 through which relay 80 is energized. The latter deenergizes with its contacts 801 and 802 relay 78 and the electromagnet 87 respectively, whereby the valve 19 is dropped into its closed or neutral position and shuts off the space 32. Relay 78 also breaks the exciting circuits of relays 67, 73 and 79. When relay 79 is deenergized relay 75 is also deenergized thereby shutting down the fan 17, when the same has not yet been shut down by a contact 791, and the circuit is thus reset and may again be actuated for selecting a desired garage.

It is evident that a similar circuit having one selecting push-button $64_I$ and one selecting relay $65_I$ only may be used for actuating the plant shown in FIG. 1.

Further an elevator as shown in FIG. 9 may be operated by any one of the well known control circuits for elevators when adapted for the specific requirements of this invention. Instead of operating the usual elevator motor in opposite direction for upward or downward movement of the elevator the means described in FIG. 11 for raising and lowering the building are actuated. In such a control circuit additional means may easily be provided for interruption of the downward movement of the elevator or building at any place, for instance by providing further control cams 70 and control switches 71 for every floor or garage, such switches being connected in parallel through relay contacts similar to contacts 655 and 656 so that only one of contacts 71 is rendered operative at a time by the relay 65 associated with the floor at which the elevator is required to be stopped.

In the claims it is to be understood that "pressure" is both positive and negative pressure, that is, pressure greater and lower (vacuum) than atmospheric pressure.

Although certain specific embodiments of the invention have been shown and described, it is obvious that many modifications thereof are possible. The invention, therefore, is not to be restricted except insofar as is necessitated by the prior art and by the spirit of the appended claims.

I claim:

1. A pressure medium operated elevating plant comprising a sunken elongate casing closed at one end, a movable hollow body in said casing in tight contact with the side walls thereof to substantially seal the chamber defined by the closed casing end and the body, pressure means for moving the pressure medium having a pressure outlet and an exhaust inlet, a conduit system for transporting the pressure medium, valve means, said conduit system including a first conduit communicating with the chamber, a second conduit communicating with the atmosphere, a third conduit communicating with said pressure outlet, and a fourth conduit communicating with said exhaust inlet, said four conduits all being in communication with said valve means, said valve means selectively communicating; the first and third, and second and fourth conduits to supply gas pressure medium under pressure to said chamber for raising said body; and the first and fourth, and second and third conduits to permit the pressure means to remove pressure from said chamber for lowering said body; means for automatically locking the body to the casing at preselected levels, said locking means being pressure actuated to unlock the body from the casing so that upon pressure failure locking will take place, and automatic means operatively associated with said automatic locking means for permitting automatic unlocking only when the pressure in said chamber is sufficient to sustain said body.

2. A pressure medium operated elevating plant comprising a sunken elongate casing closed at one end, a movable body in said casing in sealing contact with the side walls thereof to seal the chamber defined by the closed casing end and the body, pressure varying means, means for communicating said chamber with said pressure varying means, means for locking the body to the casing, means controlling said communicating means and locking means to selectively communicate said pressure varying means with said chamber and to automatically release said locking means only when the pressure in said chamber is at a predetermined value.

3. The plant of claim 2 wherein said locking means are fluid operated, said locking means including one of said casing and body having an undercut slot formed therein, a fluid operated cylinder in the other of said casing and body and disposed perpendicular thereto, a piston movable in said cylinder and having a projecting flange engageable in said slot so that said flange engages the wall of said undercut slot to affect locking and relative movement of said casing and body normal to the axis of said cylinder is necessary before unlocking may take place even though the piston is urged to unlocking position, whereby upon pressure failure, locking takes place automatically.

4. A gas operated elevating plant comprising a pit having a bottom, a body movable in said pit and sealing the space in the pit between the bottom and the body, a pressure varying means having a pressure outlet and an inlet control means connecting said pressure varying means with said space for supplying pressurized gas thereto and exhausting gas therefrom, locking means for locking the body to the pit at preselected levels, and automatic programming means to which said control means is responsive to selectively communicate said space with said pressure varying means, pressure outlet and the atmosphere and controlling actuation of said locking means to deactuate the locking means to permit movement of the body only when the gas pressure in said space has attained a predetermined value, and manually actuated means for initiating operation of said automatic programming means.

5. The plant of claim 4 wherein said control means selectively communicates said space with said pressure varying means inlet, and said programming means controls the selective communication therebetween to exhaust gas from said space to the pressure varying means.

6. In a gas operated elevating plant, a pit having a bottom, a hollow body movable up and down between at least one lower and at least one higher level in said pit and sealing the space in said pit between said bottom and the hollow body, a control means, a means for connecting said control means with the atmosphere, a means for connecting said control means with the space in said pit between said bottom and said hollow body, a pressure varying means, a means for connecting said pressure varying means with said control means, a locking means to lock said hollow body against said pit at the higher level, a first control system for controlling said control means to selectively allow the space in said pit to be fed with gas by said pressure varying means and to connect said space with the atmosphere, a second control system for actuating said locking means to locking position and out of locking position, said first control system being interconnected with said second control system in a manner to bring said locking means out of position only after a certain gas pressure has been secured by said pressure varying means in the space between said bottom and said hollow body, and an operating means for initiating operation of said first and second control system.

7. In an installation comprising a shaft and a body movable up and down in said shaft, said body acting in a piston-like manner to seal the part of the shaft lying beneath the body and form a cylinder space in which a pressure medium is effective for lifting and lowering the body, the combination of at least one locking device with said shaft and body effective between the body and a wall of the shaft to retain the body at a selected level, a first means urging said locking device into a locking position, and a second means for shifting said locking device into an unlocking position against the force of said first means upon presence in the shaft of the minimum pressure necessary for lifting the body.

8. In an installation, the combination according to claim 7 wherein said locking device comprises a horizontal cylinder arranged in one of said shaft and body, and a differential piston having an enlarged diameter inner face and a smaller diameter outer portion and slidable in said cylinder, said first means including a spring bearing against the inner face of the piston, an annular space in the cylinder surrounding said smaller portion of the piston and communicating with the shaft portion lying beneath the body, and a recessed hole in the other of said shaft and body adapted to receive the smaller, free end portion of said piston under the urging of said spring to lock the body in the shaft.

9. In an installation, the combination according to claim 8, wherein said recessed hole is formed by walls including a shoulder vertically projecting into the hole and an annular groove formed on the outer free end of the differential piston, said shoulder entering said groove in the locking position of the locking device.

References Cited in the file of this patent
UNITED STATES PATENTS

| | | |
|---|---|---|
| 143,013 | Hubbard | Sept. 23, 1873 |
| 459,229 | Blades | Sept. 8, 1891 |
| 493,301 | Rowland | Mar. 14, 1893 |
| 1,773,163 | Becker | Aug. 19, 1930 |
| 1,914,128 | James | June 13, 1933 |
| 2,617,498 | Camerota | Nov. 11, 1952 |
| 2,687,815 | Simon | Aug. 31, 1954 |
| 2,856,028 | Racely | Oct. 14, 1958 |
| 2,861,449 | Cohan | Nov. 25, 1958 |
| 2,927,661 | Kristek | Mar. 8, 1960 |

FOREIGN PATENTS

| | | |
|---|---|---|
| 828,280 | France | Feb. 7, 1938 |
| 1,139,469 | France | Feb. 11, 1957 |
| 748,701 | Great Britain | May 9, 1956 |

UNITED STATES PATENT OFFICE

CERTIFICATE OF CORRECTION

Patent No. 3,018,850 January 30, 1962

Hans Beat Fehlmann

It is hereby certified that error appears in the above numbered patent requiring correction and that the said Letters Patent should read as corrected below.

Column 8, line 38, strike out "gas".

Signed and sealed this 12th day of June 1962.

(SEAL)
Attest:

ERNEST W. SWIDER
Attesting Officer

DAVID L. LADD
Commissioner of Patents